Patented Aug. 31, 1948

2,448,252

UNITED STATES PATENT OFFICE 2,448,252

PREPARATION OF PERACID SOLUTIONS

William R. Cornthwaite, Wilmington, Del., and Arthur A. Elston, Niagara Falls, N. Y., assignors to E. I. du Pont de Nemours & Company, Wilmington, Del., a corporation of Delaware No Drawing. Application August 2, 1946, Serial No. 687,974

7 Claims. (Cl. 260—502)

Solutions of organic peracids are useful as bleaching agents and in many cases are superior bleaching agents as compared with aqueous solutions of hydrogen peroxide. Peracid solutions have been made heretofore by reacting the anhydrides of carboxylic acids with peroxides in aqueous solutions. Generally the peracid solutions are prepared by reacting the anhydride with an alkaline peroxide solution, thus forming a solution of an alkali metal salt of the peracid, which is the solution most generally preferred for bleaching operations. For example, a solution of sodium peracetate may be prepared by reacting acetic anhydride with a solution of sodium peroxide to form a solution of sodium peracetate, which is an excellent bleaching agent. However, the acid anhydrides are generally relatively expensive reagents and some of them, like acetic anhydride, are corrosive and have strong odors. These disadvantages have hindered the commercial utilization of peracid solutions for bleaching purposes. Also the above method of preparing peracid solutions cannot be used to prepare solutions of performic acid, since formic acid has no anhydride. The organic peracids cannot be made by reacting peroxide in dilute solution with carboxylic acids. Such operation instead produces solutions which effectively are solutions of perhydrates of the acids or their salts. For example reaction of acetic acid with an aqueous sodium peroxide solution produces essentially a solution of sodium acetate perhydrate:

$$CH_3COONa.H_2O_2$$

This is less effective as a bleaching agent than an aqueous solution of peracetic acid:

$$(CH_3CO-OOH)$$

An object of the present invention is a new and improved method for producing solutions of organic peracids. Another object is a simple and inexpensive process for the production of performic acid solution. Other objects will be apparent from the following description of our invention.

The above stated objects may be attained in accordance with the present invention by reacting an ester of a carboxylic acid with an alkaline aqueous peroxide solution. We have found that this method of operation under suitable conditions produces solutions of peracids rapidly and relatively inexpensively. To illustrate the invention, an account is given of the preparation of the alkaline solutions of a number of peracids, wherein various esters of carboxylic acids were reacted with aqueous alkaline solutions of hydrogen peroxide. These preparations were carried out by dissolving sodium peroxide in water to form solutions having a volume concentration from 1–10 volumes; adding thereto the ester of a carboxylic acid and stirring the mixture until substantially all of the ester had reacted as evidenced by complete solution of the ester. This required from about 5 to 30 minutes' time. The reaction conditions and the resulting yields of peracid are given in the following table:

| Ester | Yield in Per Cent | Conditions Under Which Yield Was Obtained | | |
|---|---|---|---|---|
| | | Vol. Conc. of Peroxide | Molar Ratio Ester: Peroxide | Temp. in ° F. |
| Methyl acetate | 85.5 | 6 | 4:1 | 40 |
| Ethyl acetate | 49.2 | 10 | 2:1 | 78 |
| Methyl hydroxy acetate | 39.6 | 2 | 2:1 | 52–62 |
| n-Propyl acetate | 26.2 | 4 | 4:1 | 58–56 |
| Isopropyl acetate | 9.1 | 1 | 1:1 | 45 |
| Isobutyl acetate | 2.0 | 1 | 1:1 | 82 |
| Isoamyl acetate | 4.3 | 10 | 1:1 | 78 |
| Methyl formate | 96.0 | ½ | 4:1 | 33–35 |
| Ethyl formate | 73.8 | 1 | 1:1 | 53 |
| Glycol diformate | 78.5 | 1 | 4:1 | 40 |
| Ethyl succinate | 19.2 | 1 | 3:1 | 52 |
| Methyl phthalate | 61.3 | 4 | 2:1 | 88 |
| Ethyl benzoate | 2.4 | 2 | 1:1 | 110 |

We have found that in order to carry out the reaction between the ester and the peroxide, a highly alkaline condition is requisite and the peroxide solution initially and during the reaction must have a pH not less than 11.

For example we found that by reacting 2 moles of methyl acetate with 1 mole of $Na_2O_2$ in a 2 volume solution at room temperature, the yield of peracid was 48.5% when the peroxide solution had an initial pH of 10.8 to 11.0. When the same procedure was followed, except at an initial pH of 10.0 or lower, the yield was 2.5%.

Generally it is preferred to obtain a suitable alkaline peroxide solution by merely dissolving an alkaline peroxide such as sodium peroxide in water in a concentration of from 1–25 volume concentration, which corresponds to 0.7 to 17.5% by weight of sodium peroxide. However, equivalent results may be obtained by adding an alkali, preferably an alkali metal hydroxide, to an aqueous solution of hydrogen peroxide so as to bring the pH of the solution up to not less than 11. Any strong alkali may be utilized for this purpose, for example any of the alkali metal hydroxides or strongly alkaline alkali metal salts such as sodium silicate, trisodium phosphate and the like, or mixtures thereof. If the alkaline peroxide solution is made by dissolving an alkali metal peroxide in water, acid may be added if desired so long as the alkalinity is not reduced to below a pH of 11. So far as can be learned, there is no upper limit to the alkalinity of the solution and if desired any desired amount of strong alkali such as caustic soda can be added to the peroxide solution within the limits of solubility.

Generally we prefer to utilize a relatively dilute peroxide solution within the range of about 1–10 volumes concentration. However, higher concentrations, e. g., up to 25 volumes may be utilized if desired. It should be explained that the term "volume concentration" used herein is a term commonly used to designate the concentration of peroxide solutions. A solution of one volume has such concentration of peroxide that 1 cc. of the solution, measured at 20° C., when treated to cause complete decomposition of the peroxide therein, will evolve 1 cc. of oxygen gas, measured at normal temperature and pressure. Similarly, 1 cc. of a 10 volume solution will evolve 10 cc. of oxygen.

The reaction occurs readily at room temperature, and when the reaction mixture is efficiently agitated the reaction is usually complete within 5 to 30 minutes. It is preferred to avoid elevated temperatures as such will result in loss of peroxide and peracid by thermal decomposition. For that reason we prefer never to permit the temperature to exceed about 120° F. In general it is preferred to maintain the reaction temperature between about 30 and 80° F. and in some cases it is desirable to apply cooling to the reaction mixture to maintain it at the desired reaction temperature.

As shown by the foregoing experimental results, the best yields are obtained by using esters of saturated, aliphatic alcohols having a low molecular weight. Generally it is preferred to utilize esters of saturated alcohols having not more than 5 carbon atoms in the alcohol radical. The best yields generally are obtained from the methyl and ethyl esters. The present invention is suitable for preparing the peracids of any carboxylic acids regardless of molecular weight of the acid. Such peracids may be aliphatic or aromatic, and if aliphatic they may be cyclic or non-cyclic, saturated or unsaturated. The acids also may be monobasic or polybasic. In addition to the peracids shown in the preceding examples, the following also may be produced by means of this invention:

| | |
|---|---|
| Percrotonic | Perbutyric |
| Peracrylic | Perisobutyric |
| Permethacrylic | Perfuroic |
| Permaleic | Perterephthalic |
| Perfumaric | Perisophthalic |
| Perpropionic | |

The completion of the above described reaction results in the formation of a solution of an alkali metal salt of the desired peracid. This is equivalent to an alkaline solution of a peracid.

After completion of the reaction between the ester and the peroxide solution, the reaction mixture may be acidified to any desired degree. By adding sufficient acid to make the solution substantially neutral or acid, preferably the latter, say to a pH in the neighborhood of 5.0, a relatively stable solution of the peracid is formed. Such solutions then can be made alkaline if desired when they are to be used as bleaching solutions. In most cases it is preferred to prepare the alkaline peroxide solution at the place where it is to be used as a bleaching agent or for other uses where an active oxygen solution is required.

We claim:
1. The process for preparing a solution of a member of the group consisting of the organic peracids and their alkali forming salts which comprises reacting an alkyl ester of a carboxylic acid with an alkaline aqueous peroxide solution having a pH not lower than about 11.

2. The process for preparing a solution of a member of the group consisting of the organic peracids and their alkali forming salts which comprises reacting an alkyl ester of a carboxylic acid with an alkaline aqueous peroxide solution and thereafter acidifying the solution to form an aqueous peracid solution.

3. The process for preparing a solution of a member of the group consisting of the organic peracids and their alkali forming salts which comprises reacting an alkyl ester of an aliphatic carboxylic acid, in which the alcohol radical contains not more than 5 carbon atoms, with an aqueous solution of sodium peroxide having a pH not lower than about 11.

4. The process for preparing a solution of a member of the group consisting of performic acid and its alkali forming salts which comprises reacting a formic acid alkyl ester with an aqueous solution of sodium peroxide having a pH not lower than about 11.

5. The process for preparing performic acid which comprises reacting methyl formate with an aqueous solution of sodium peroxide having a pH not lower than about 11 and thereafter acidifying said solution to form an aqueous solution of performic acid.

6. The process for preparing a solution of a member of the group consisting of peracetic acid and its sodium salt which comprises reacting an acetic acid alkyl ester with an aqueous solution of sodium peroxide having a pH not lower than about 11, said alcohol containing not more than 5 carbon atoms.

7. The process for preparing peracetic acid which comprises reacting methyl acetate with an aqueous solution of sodium peroxide having a pH not lower than about 11 and thereafter acidifying said solution to form a solution of peracetic acid.

WILLIAM R. CORNTHWAITE.
ARTHUR A. ELSTON.

REFERENCES CITED

The following references are of record in the file of this patent:

UNITED STATES PATENTS

| Number | Name | Date |
|---|---|---|
| 2,377,038 | Reichert | May 29, 1945 |

FOREIGN PATENTS

| Number | Country | Date |
|---|---|---|
| 7,633 | Great Britain | Nov. 18, 1909 |